Aug. 31, 1943.  C. D. REED  2,328,495
METHOD AND APPARATUS FOR NUT MANUFACTURE
Filed March 28, 1941  2 Sheets-Sheet 1
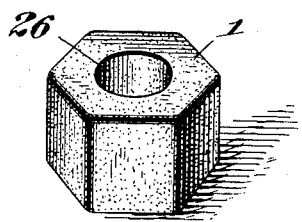
Fig. 1.
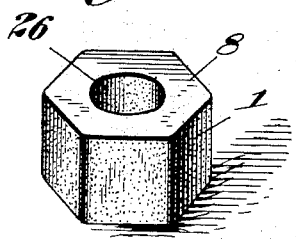
Fig. 2.
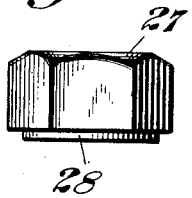
Fig. 4.
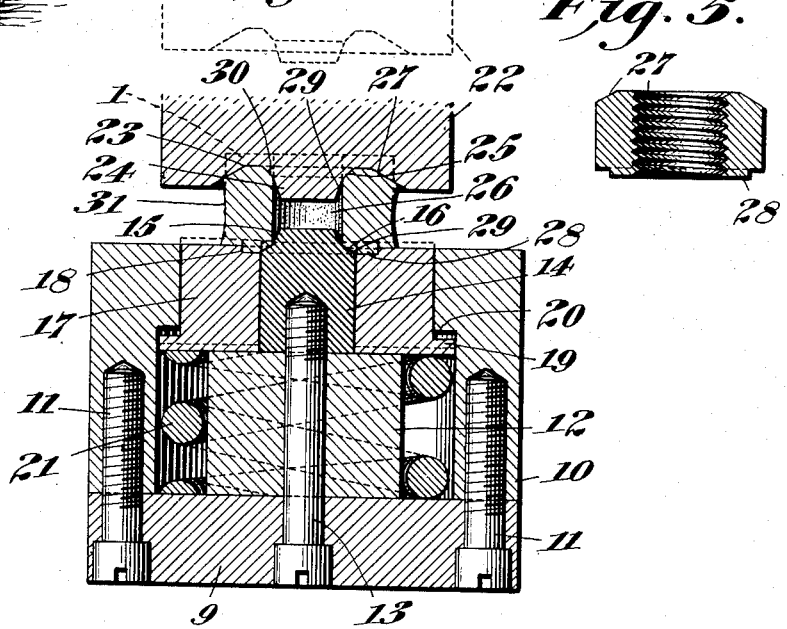
Fig. 3.
Fig. 5.
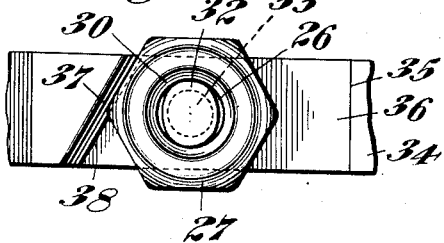
Fig. 6.
Inventor
Claude D. Reed.
By R. S. A. Dougherty
Attorney Aug. 31, 1943.   C. D. REED   2,328,495
METHOD AND APPARATUS FOR NUT MANUFACTURE
Filed March 28, 1941   2 Sheets-Sheet 2

Inventor
Claude D. Reed.
By R. S. C. Dougherty.
Attorneys

Patented Aug. 31, 1943

2,328,495

UNITED STATES PATENT OFFICE 2,328,495

METHOD AND APPARATUS FOR NUT MANUFACTURE

Claude D. Reed, Lebanon, Pa., assignor to Bethlehem Steel Company, a corporation of Pennsylvania Application March 28, 1941, Serial No. 385,643

16 Claims. (Cl. 10—85)

This invention relates to a new method and apparatus for the manufacture of nuts having a finished polished surface.

One of the objects of the invention relates to the steps in the manufacture of hexagonal shaped nuts or the like made by hot pressed forging in which the blank is taken cold and the top and bottom ends ground or polished smooth. The blank is then placed between dies and the smooth ends cold forged to produce a crowned top and an integrally formed washer face on the bottom surface of the blank. During this operation beveled surfaces are also formed by the dies at the ends of the axial opening of the blanks to facilitate threading of the same. This cold forging of the crown and washer face on the ends of the nut blank distorts the sides of the same. The sides of the nut blank are then ground to remove this distortion and to form a smooth polished surface, after which the interior portion of the nut is threaded to complete the nut forming operation.

A further object of my invention relates to the manner and mechanism for cold forging the crown and washer face on the ends of the nut blank.

Another object of the invention relates to the manner of forming the retaining pin and nut holder for retaining the nut blanks in proper position on the carrier disk during the grinding of the sides.

With these and other objects in view the invention consists of certain steps in operation which will be more fully explained hereinafter and pointed out in the appended claims.

Having thus given a general description of my invention, I will now, in order to make the same more clear, refer to the accompanying two sheets of drawings forming a part of this specification and in which like characters refer to like parts.

Figure 1 is a perspective view of a nut blank formed by a hot pressed forging operation and indicating the rough outer surface thereof;

Fig. 2 is a perspective view of the nut blanks shown in Fig. 1 after the ends of the blanks have been ground smooth;

Fig. 3 is a vertical section showing the die forming operation for producing the crown and washer face on the top and bottom surfaces of the nut blank and also for producing the chamfered surfaces at the ends of the axial opening formed therein;

Fig. 4 is a side elevation showing the finished outer surface of the nut blank;

Fig. 5 is a vertical section of the finished nut after the screw threading operation;

Fig. 6 is an enlarged detail top plan view illustrating the manner of holding the nut blanks on the carrier disk during the side surfacing of the same;

Figure 7:
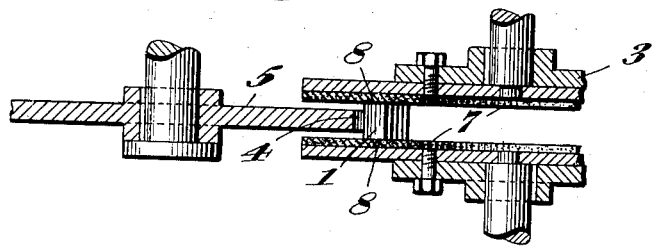
Fig. 7 is a detail view illustrating the manner of holding and grinding the ends of a nut blank.
Figure 8:
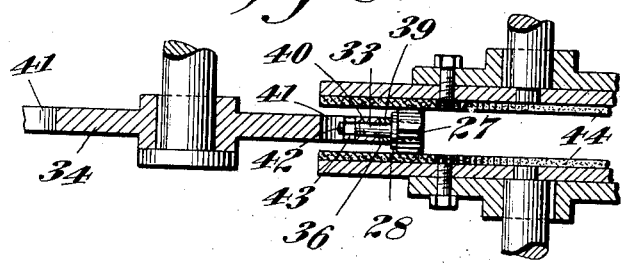
Fig. 8 is a detail view illustrating the manner of holding and grinding the sides of a nut blank.

Referring now to the various characters of reference upon the drawings, the numeral 1 designates a nut blank formed by hot pressed forging having a rough exterior surface. The cold blank 1 is then fed into a chute 2, of a machine 3, where it is fed by gravity into the notches 4 of a carrier disk 5. It is then advanced by means of a motor drive 6 between a pair of rotating grinding disks 7 where the ends 8 of the nut blanks are ground smooth and polished. The nut blank is then inserted between dies as indicated in dotted line in the mechanism shown in Fig. 3. This mechanism comprises a bottom plate 9 for a die shell 10 which is attached thereto by means of bolts 11. A filler block 12 is mounted centrally on the bottom plate 9 for the die shell 10 upon which is mounted centrally and secured in position by means of a bolt 13 a countersinking die 14 which is provided with a pair of beveled extending portions 15 and 16. Surrounding the countersinking die 14 is a facing die 17 having an annular recess 18 formed in its upper surface for the purpose of forming a washer face on the nut blank and has a flange 19 extending outwardly from its lower edge adapted to engage an inwardly extending flange 20 of the shell 10. Surrounding the filler block 12 within the die shell 10 between the bottom die plate 9 and the flanged end 19 of the facing die 17 is a helical spring 21 which is normally adapted to hold the facing die 17 in its raised position. Adapted to reciprocate above the countersinking die 14 and the facing die 17 is a crowning die 22 having a recess 23 formed therein for this purpose, and a projecting central portion with double beveled surfaces 24 and 25.

When the nut blank having its ends ground and polished is inserted between the dies shown in Fig. 3 the crowning die 22 is raised and the blank is placed on the countersinking die 14 with the beveled end 15 extending into the lower end of the axial opening 26 formed in the nut blank thereby centering the blank thereon at the lower end as indicated in dotted lines. The crowning die 22 is then advanced, the beveled projecting portion 24 entering the top end of the axial opening 26 to center the upper end of the blank and then advanced to the position shown in full lines in Fig. 3 thereby cold forging a crown 27 on one end of the blank and a washer face 28 on the opposite end, at the same time the top end edges of the axial opening 26 will be chamfered as indicated at 29 and 30 by means of the beveled projections 16 and 25 of the countersinking die 14, and the crowning die 22, respectively. Owing to the pressure exerted on the ends of the blank during this operation the sides of the blank will be formed slightly concaved as indicated at 31.

After cold forging the ends of the nut blank as above described, the crowning die 22 is again raised to the dotted line position and the helical spring 21 will exert pressure on the facing die 17 thereby stripping the nut blank from the end of the countersinking die 14. The blank can then be removed by the operator and another blank placed between the dies and this operation repeated.

Figure 11:
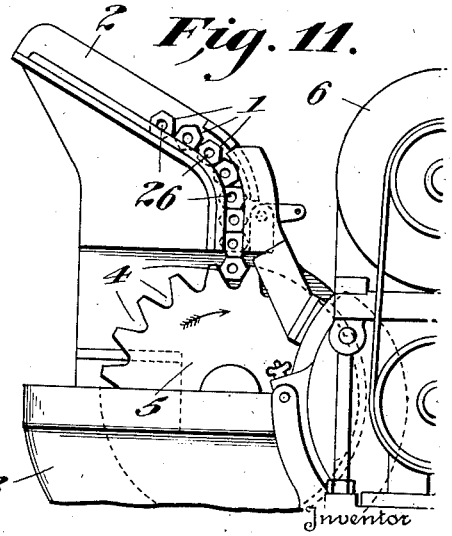
Fig. 11 illustrates the manner of feeding the nut blanks to the machine for grinding the ends of the blanks as shown in Fig. 7.

After the nut blank has been crowned and a washer face formed thereon it is fed to a machine for grinding the sides of the blank. I am aware that grinding and finishing the ends and sides of nut blanks are old and well known in the art of nut manufacture. A machine adapted for this purpose is disclosed in a patent issued to Jones, No. 1,923,931, dated August 22, 1933, and although this patent is shown adapted for grinding the sides of nut blanks, by changing the carrier disk to the form shown in Fig. 11 of this application it could be altered for grinding the ends of the nut blanks equally as well.

Figure 9:
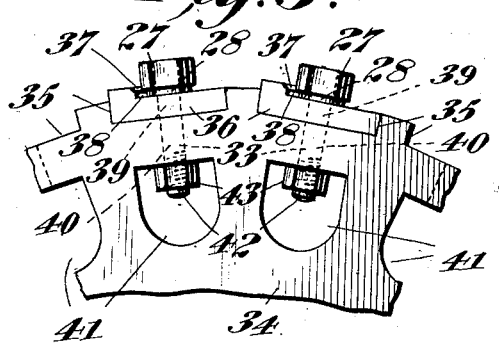
Fig. 9 is a detail side elevation of a portion of the carrier disk showing the manner of attaching the retainer pins and nut holders thereto.
Figure 10:
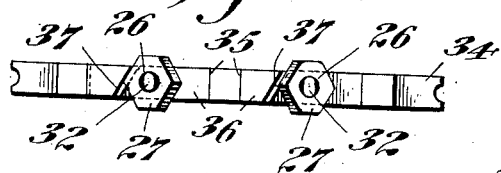
Fig. 10 is a top plan view of the portion of the carrier disk shown in Fig. 9.

The crowned nut blank with the washer face formed thereon is now fed to a machine similar to the one disclosed in the above mentioned Jones patent and preferably placed manually on one of a plurality of the projecting stud ends 32 of a retaining pin 33 which are secured to the peripheral edge of a carrier disk 34. The peripheral edge of the carrier disk 34 is provided with recesses 35 each adapted to receive a nut holder 36 having beveled and radially extending inclined projecting surfaces 37 and 38, respectively, adapted to engage one side edge of the nut blank as indicated in Figs. 6, 9 and 10 to hold the nut blank and prevent it from turning during the grinding operation.

The stud end 32 of the retaining pin 33 is somewhat larger than the shank of the same which extends radially through registering holes 39 and 40 in the nut holder 36 and the carrier disk 34, respectively, with the inner end projecting into an opening 41 in the said carrier disk adjacent to the recess 35 and is threaded as at 42 to receive a nut 43.

After each nut blank has been advanced by the carrier disk 34 between the grinding disks 44 and the two adjacent sides have been ground the nut blank is indexed by rotating it a partial revolution to present another pair of side surfaces to the grinding disk. If the nut blank is for a hexagon sided nut it will be indexed twice and then ejected from the machine, all of which is described in the Jones patent.

It has been found by actual practice that if a nut blank is placed on a plain stud extending from the carrier disk without any backing that the nut blank is liable to turn somewhat while passing between the grinding disks thereby cutting more from one side of the blank than from the adjacent side so that the sides are not uniform, and in order to obviate this, the studs 32 are made oval in cross-section and slightly smaller than the axial opening 26 in the blank 1 as indicated in Fig. 6, thereby allowing the inclined sides of the blank to adjust themselves to the inclined surfaces 37 and 38 but enabling the blank to be indexed and more easily ejected from the machine, after which the blank is threaded to produce a finished nut.

Although I have shown and described my invention in considerable detail, I do not wish to be limited to the exact and specific details shown and described, but may use such substitutions, modifications or equivalents thereof, as are embraced within the scope of my invention or as pointed out in the claims.

Having thus described my invention, what I claim as new and desire to secure by Letters Patent is:

1. The method of making nuts which comprises taking a forged nut blank having an unfinished surface, polishing the ends by grinding or the like, then subjecting the blank to axial pressure between dies to form a crown on one end of the blank and a washer face on the opposite end, and then polishing the sides of the nut blank by grinding or the like.

2. The method of making nuts which comprises taking a forged nut blank, polishing the ends by grinding or the like, then subjecting the ends of the blank to axial pressure between dies to form a crown on the top end of the blank and a washer face on the bottom end thereby expanding the ends of the blank and producing a concaved outer surface at the sides of the blank, and then polishing by grinding or the like the sides of the blank to produce uniform side surfaces parallel to each other.

3. The method of making nuts which comprises taking a forged nut blank having an axial perforation, polishing the ends of the blank by grinding or the like, then subjecting the ends of the blank to axial pressure between dies to form a crown on one end of the blank and a washer face on the opposite end thereby expanding the ends of the blank and distorting the side surfaces, simultaneously producing chamfered surfaces at the ends of the axial perforations, then polishing by grinding or the like the outside side surfaces of the blank to produce uniform side surfaces parallel to each other, and finally forming threads therein.

4. The method of making nuts which comprises taking a nut blank formed by hot pressed forging, polishing the ends by grinding or the like the nut blank cold, then subjecting the blank to axial pressure between dies to cold forge a crown on one end and a washer face on the opposite end of the blank, and then polishing by grinding or the like the sides of the nut blank.

5. The method of making nuts which comprises taking a nut blank having an axial perforation therein formed by hot pressed forging, polishing by grinding or the like the ends of the nut blank cold, then subjecting the blank to axial pressure between dies to cold forge a crown on one end and a washer face on the other end of the blank, simultaneously forming chamfered surfaces at each end of the axial perforation, and then polishing the sides of the nut by grinding or the like.

6. The method of making nuts which comprises taking a nut blank formed by hot pressed forging having an axial perforation, polishing the ends of the blank by grinding or the like, then subjecting the blank to axial pressure between dies which engage the polished ends of the blank and cold forging a crown on one end and a washer face on the other end of the blank, simultaneously forming chamfered surfaces at the ends of the axial perforation, polishing the sides of the blank by grinding or the like, and finally threading the blank to form a finished nut.

7. The method of making nuts which comprises taking a nut blank formed by hot pressed forging, polishing cold the ends of the blank by grinding or the like, then subjecting the blank to axial pressure between dies to cold forge a crown on the top end of the blank and a washer face on its bottom end thereby expanding the ends of the blank and producing a concaved outer surface thereon, and then polishing by grinding or the like the sides of the blank and producing uniform parallel side surfaces.

8. A device for cold forging nut blanks having an axial perforation comprising a countersinking die provided with means for centering the blank thereon, a facing die surrounding the countesinking die having an annular recess in its upper face, and a crowning die coacting with the facing die to form a crown on one end of the blank and a washer face on the opposite end of said blank.

9. A device for cold forging nut blanks having an axial perforation, comprising a countersinking die provided with a projecting end for extending into the axial perforation for centering the blank thereon, a reciprocating facing die surrounding the countesinking die having an annular recess in its upper face, a die having a crowning recess in its lower face coacting with the facing die to form a crown on one end of the blank and a washer face on the opposite end of said blank, and means for reciprocating the facing die to strip the nut blank from the countersinking die.

10. A device for cold forging nut blanks having an axial perforation comprising a countersinking die having a beveled end adapted to extend into one end of the axial perforation and center the blank thereon, a facing die surrounding the countersinking die having an annular recess formed in its upper surface, a die having a crown forming recess in its lower face disposed above the countersinking and facing dies coacting with the facing die and adapted to exert axial pressure on the nut blank to form a crown on one end of the blank and a washer face on the opposite end thereof, and resilient means engaging the facing die for stripping the blank from the countersinking die.

11. A device for cold forging a crown and a washer face on the ends of a nut blank having an axial perforation, comprising a countersinking die having a beveled end projection adapted to extend into one end of the axial perforation and center the blank thereon, a movable facing die surrounding the countersinking die having an annular washer forming recess in its upper surface, a die having a crown forming recess in its lower face disposed above the countersinking and facing dies adapted to exert axial pressure on the nut blank to form a crown on one end of the blank and a washer face on the opposite end, means for beveling the end edges of the axial perforation of the nut blank, and means for stripping the nut blank from the countersinking die.

12. A device for cold forging a nut blank, comprising a facing die having an annular recess in its upper face, means for centering the blank on the facing die, a die having a crowning recess in its lower face disposed above the facing die coacting with the facing die and adapted to exert axial pressure on the nut blank to form a crown on one end of the blank and a washer face on the opposite end thereof.

13. A device for cold forging a nut blank having an axial perforation comprising a bottom plate, a die shell secured thereto, a filler block disposed centrally within the die shell secured to the bottom plate, a countersinking die secured to the filler plate, a facing die having an annular washer forming recess in its upper surface surrounding the countersinking die and movably mounted above the filler block, means for centering the blank on the countersinking die, and a die having a crown forming recess in its lower face adapted to coact with the facing die to exert axial pressure on the nut blank to form a crown on one end of the blank and a washer face on the opposite end thereof.

14. A device for cold forging a nut blank having an axial perforation comprising a bottom plate, a die shell having an inwardly extending top flange secured thereto, a filler block disposed centrally within the die shell secured to the bottom plate, a countersinking die secured centrally to the top of the filler block, a facing die having an annular washer forming recess in its upper surface surrounding the countersinking die and movably mounted above the filler block, an outwardly extending flange at the lower end of the facing die adapted to engage the inwardly extending flange of the die shell, means for centering the blank on the countersinking die, a die having a crown forming recess in its lower face adapted to coact with the facing die to exert axial pressure on the nut blank to form a crown on one end of the blank and a washer face on the opposite end thereof.

15. A device for cold forging a nut blank having an axial perforation, comprising a bottom plate, a die shell having an inwardly extending top flange secured to the bottom plate, a filler block disposed centrally within the die shell secured to the bottom plate, a countersinking die secured centrally to the top of the filler block, a facing die having an annular washer forming recess in its upper surface surrounding the countersinking die and movably mounted above the filler block, an outwardly extending flange at the lower end of the facing die adapted to engage the inwardly extending flange of the die shell to limit its movement, means for centering the blank on the countersinking die, a die having a crown forming recess in its lower face adapted to coact with the facing die to exert axial pressure on the nut blank to form a crown on one end of the blank and a washer face on the opposite end thereof, a spring surrounding the filler block engaging the lower end of the facing die for stripping the blank from the countersinking die, and means for beveling the end edges of the axial perforation of the blank.

16. The method of making nuts which comprises taking a forged nut blank having an unfinished surface, polishing the ends of the blank by grinding or the like, and then subjecting the blank to axial pressure between dies to form a crown on one end of the blank and a washer face on the opposite end in one operation.

CLAUDE D. REED.